United States Patent
Endo

(10) Patent No.: US 7,220,212 B2
(45) Date of Patent: May 22, 2007

(54) CONTROL SYSTEM FOR HYBRID VEHICLES

(75) Inventor: Hiroatsu Endo, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 244 days.

(21) Appl. No.: 11/094,244

(22) Filed: Mar. 31, 2005

(65) Prior Publication Data

US 2005/0233856 A1  Oct. 20, 2005

(30) Foreign Application Priority Data

Apr. 15, 2004 (JP) .............................. 2004-120773

(51) Int. Cl.
*B60K 1/02* (2006.01)

(52) U.S. Cl. ........................................................ 477/3

(58) Field of Classification Search ............... 180/65.2, 180/65.7, 65.8; 903/945, 930, 942; 477/3, 477/116

See application file for complete search history.

(56) References Cited

U.S. PATENT DOCUMENTS

| | | | | |
|---|---|---|---|---|
| 6,077,186 A | * | 6/2000 | Kojima et al. ................. | 477/3 |
| 6,334,498 B1 | * | 1/2002 | Morisawa et al. .......... | 180/65.2 |
| 7,096,099 B2 | * | 8/2006 | Itoh et al. ..................... | 701/22 |
| 7,134,982 B2 | * | 11/2006 | Ozeki et al. .................... | 477/3 |
| 2002/0023789 A1 | * | 2/2002 | Morisawa et al. ......... | 180/65.2 |

FOREIGN PATENT DOCUMENTS

| | | |
|---|---|---|
| JP | 2002-225578 | 8/2002 |
| JP | 2004-203218 | 7/2004 |
| JP | 2004-203219 | 7/2004 |
| JP | 2004-204960 | 7/2004 |
| JP | 2005-12864 | 1/2005 |

* cited by examiner

*Primary Examiner*—Charles A. Marmor
*Assistant Examiner*—Justin K. Holmes
(74) *Attorney, Agent, or Firm*—Kenyon & Kenyon LLP

(57) ABSTRACT

A control system for hybrid vehicles in which an electric prime mover is connected to an output shaft through a transmission, comprising: a running state judging means for judging whether or not a downshifting is being carried out to increase speed change ratio of the transmission while a vehicle is coasting; a creep torque lowering means for lowering creep torque generated by the electric prime mover, in case the running state judging means judges that the downshifting is being carried out; a speed change termination judging means for judging a termination of the downshifting; and a creep restoring means for raising the lowered creep torque to the previous level subsequent to the termination of downshifting, at a timing which is delayed in comparison with a timing when the torque is raised due to a torsional vibration arising from the downshifting.

16 Claims, 5 Drawing Sheets

FIG.5
(A)
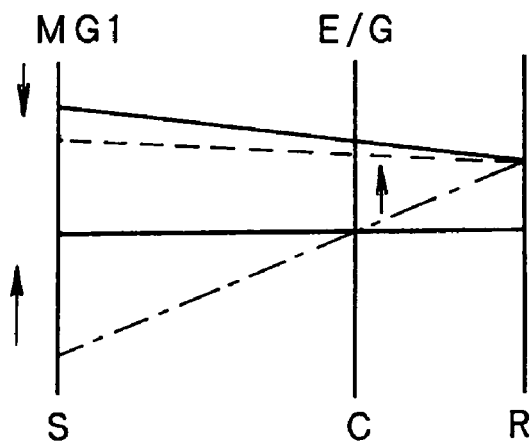
(B)
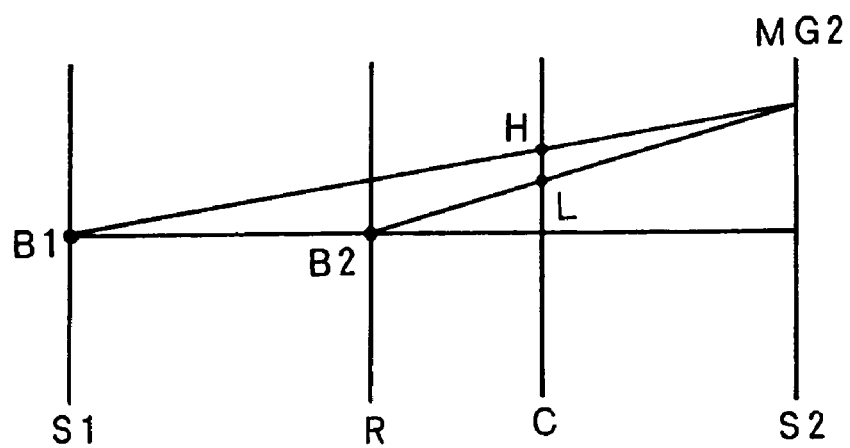

CONTROL SYSTEM FOR HYBRID VEHICLES

BACKGROUND OF THE INVENTION

1. Field of the Invention

This invention relates to a control system for hybrid vehicles having a plurality of prime movers.

The disclosure of Japanese Patent Application No. 2004-120773 filed on Apr. 15, 2004 including specification, drawings and claims is incorporated herein by reference in its entirety.

2. Discussion of the Related Art

One example of a hybrid vehicle is disclosed in Japanese Patent Laid-Open No. 2002-225578. The disclosed hybrid vehicle has a drive unit, in which an engine, a first motor generator and an output member are connected through a power distributing mechanism, and the output member and a second motor generator are connected through a transmission. Accordingly, power of the engine is distributed to the output member and to the first motor generator through the power distributing mechanism. The torque is added to or subtracted from the output member by controlling the second motor generator. Additionally, it is possible to improve the fuel economy by controlling the engine speed in line with the optimum fuel economy curve.

According to the hybrid drive unit disclosed in Japanese Patent Laid-Open No. 2002-225578, a transmission capable of being interchanged between a high gear stage and a low gear stage is arranged between the second motor generator for carrying out mainly a torque assist and the output shaft. Therefore, the output torque of the second motor generator is transmitted to the output shaft in accordance with the speed change ratio of the transmission. On the other hand, the transmission carries out the speed change operation by applying or releasing an engagement device, therefore, the torque is not transmitted temporarily at a transient time of the speed change operation.

For this reason, in case a downshifting is carried out by the transmission when the vehicle is run by inertia, the output torque of the second motor generator connected to the input side of the transmission is lowered to suppress an abrupt rise in the speed of the second motor generator. Then, the output torque of the second motor generator is raised to restore a creep torque upon completion of the speed change. In this case, the torque acts on the output shaft at a termination of the speed change so that the output shaft is twisted as a result. If the driving force of the vehicle is raised by the torsional torque simultaneously with the restoration of the creep torque which is lowered during the speed change, the driving torque becomes temporarily excessive. As a result of this, shocks arising from the speed change operation become prominent.

SUMMARY OF THE INVENTION

It is an object of the present invention to prevent a shock arises at the termination of a speed change operation, by coordinating a coast down shift control and a creep torque control.

According to the present invention, the timing when the torque is raised due to a torsional vibration arising from a downshifting, is not conform to a timing when the creep torque is restored, at the termination of the downshifting in a hybrid vehicle wherein an electric motor is connected to an output shaft through a transmission. More specifically, according to the invention, there is provided a control system for hybrid vehicles, comprising: a running state judging means for judging whether or not the down shifting is being carried out to increase the speed change ratio when a vehicle is coasting; a creep torque lowering means for lowering the creep torque generated by the electric motor in case the running state judging means judges that the downshift is being carried out; a speed change termination judging means for judging the termination of the downshifting; and a creep restoring means for raising the lowered creep torque to the previous level subsequent to the termination of the downshifting, at a timing which is delayed in comparison with the timing when the torque is raised due to the torsional vibration arising from the downshifting. The restoration of the lowered creep torque may be carried out at the instant when a preset time period has elapsed from the completion of the downshifting.

The preset time period may be determined on the basis of a period of the torsional vibration in the driveline wherein the torque is outputted from the transmission through the output shaft. Alternatively, the preset time period may be determined on the basis of a convergence time of a fluctuation in the torque of the driveline.

Moreover, the creep torque of the electric prime mover may be fluctuated to suppress the torque fluctuation appears on the output shaft at the termination of the speed change, when the creep torque is raised to be restored.

According to the invention, therefore, the instant when the speed change operation is terminated or when the torque is raised due to the torsional vibration arising from a downshift, is not conform to the instant when the creep torque is raised. In other words, the timing when the driving force is raised due to the torsion of the driveline including the output shaft resulting from the termination of the speed change, is not conform to the timing when the driving force is raised as a result of the restoration of the creep torque. Consequently, the fluctuation of the output shaft torque is suppressed so that the shock arising from the speed change operation can be prevented or suppressed.

According to the invention, moreover, the creep torque is raised according to a convergence of the periodical torque fluctuation of the driveline which arises from the torsional vibration at the termination of the speed change. For this reason, the torque is not raised by the torsional vibration simultaneously with raising the creep torque. As a result, the fluctuation range of the output shaft torque is narrowed so that the shock arising from the speed change operation is prevented or suppressed.

According to the invention, still moreover, the creep torque is started to be raised after the convergence of the periodical fluctuation in the output shaft torque. Specifically, the torque fluctuates periodically when it rises at the termination of the speed change, and the creep torque is raised when the fluctuation of the torque almost converges. Therefore, the output shaft torque and the creep torque are not raised simultaneously. As a result, the fluctuation range of the output shaft torque is narrowed so that the shock arising from the speed change operation can be prevented or suppressed.

According to the invention, furthermore, a phase to raise the creep torque is delayed in comparison with the periodical fluctuation in the output shaft torque resulting from the termination of the speed change operation. Therefore, the change of the creep torque effects to suppress the periodical fluctuation of the torque resulting from the speed change operation. As a result, the fluctuation range of the output shaft torque is narrowed so that the shock arising from the speed change operation is prevented or suppressed.

The above and further objects and novel features of the invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 5(A) is a nomographic diagram of a single pinion type planetary gear mechanism in the drive unit, and (B) is a nomographic diagram of a Ravignaux type planetary gear mechanism in the drive unit.

DETAILED DESCRIPTION OF THE PREFERRED EMBODIMENT

Figure 3:
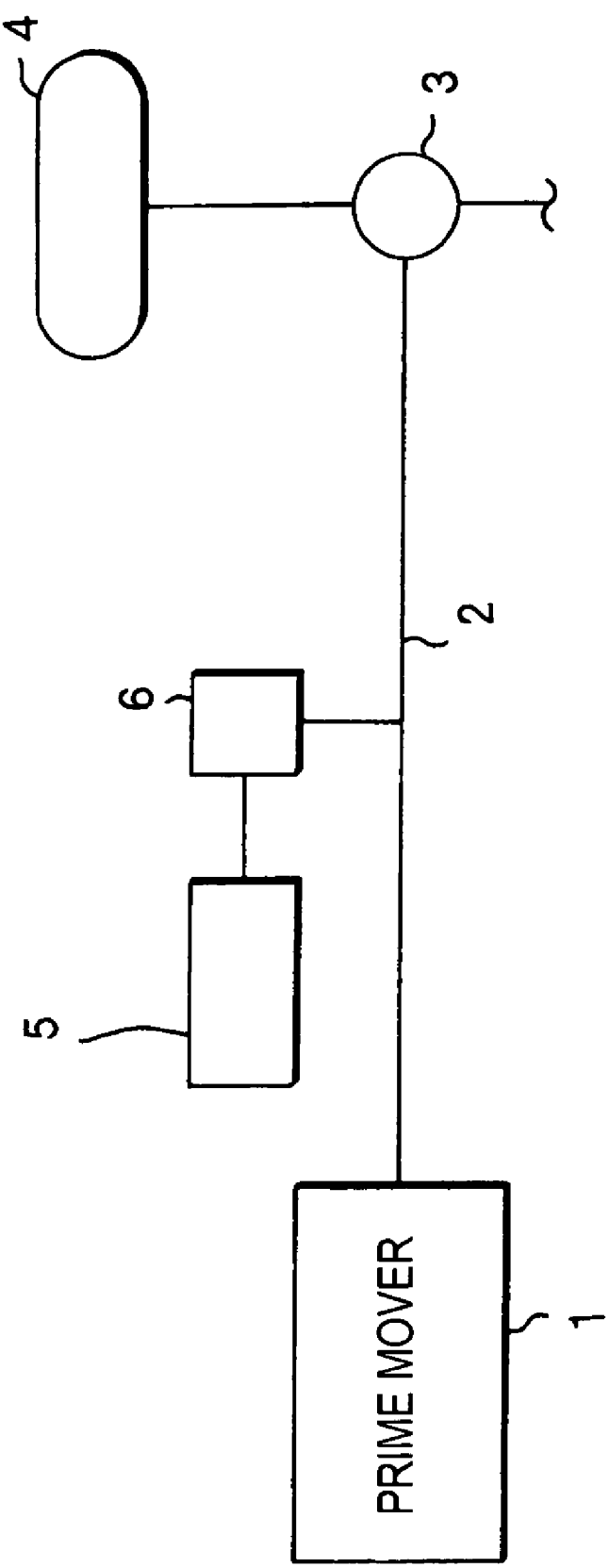
FIG. 3 is a diagram schematically showing a drive unit of a hybrid vehicle to which the invention is applied.

Next, this invention will be described in connection with its specific examples. A hybrid drive unit to which the invention is applied will be described first of all. As shown in FIG. 3, the torque of a main prime mover 1 (i.e., a first prime mover) is transmitted to drive wheels 4 through an output member 2 and a differential 3. On the other hand, there is provided an assist prime mover (i.e., a second prime mover) 5, which can make a power control to output a driving force for a drive and a regenerative control to recover energy. This assist prime mover 5 is connected through a transmission 6 to the output member 2. Between the assist prime mover 5 and the output member 2, therefore, the transmission torque capacity is increased/decreased according to a speed change ratio to be set by the transmission 6.

The transmission 6 can be constructed to set the speed change ratio at "1" or higher. With this construction, at the power running time in which the assist prime mover 5 outputs the torque, this torque can be raised as it is transmitted to the output member 2 so that the assist prime mover 5 can be made to have a low capacity or a small size. However, it is preferable to operate the assist prime mover 5 efficiently; therefore, the speed of the assist prime mover 5 is lowered by reducing the speed change ratio in case the speed of the output member 2 rises according to the vehicle speed for example. On the other hand, the speed change ratio may be raised in case the speed of the output member 2 drops.

Figure 4:
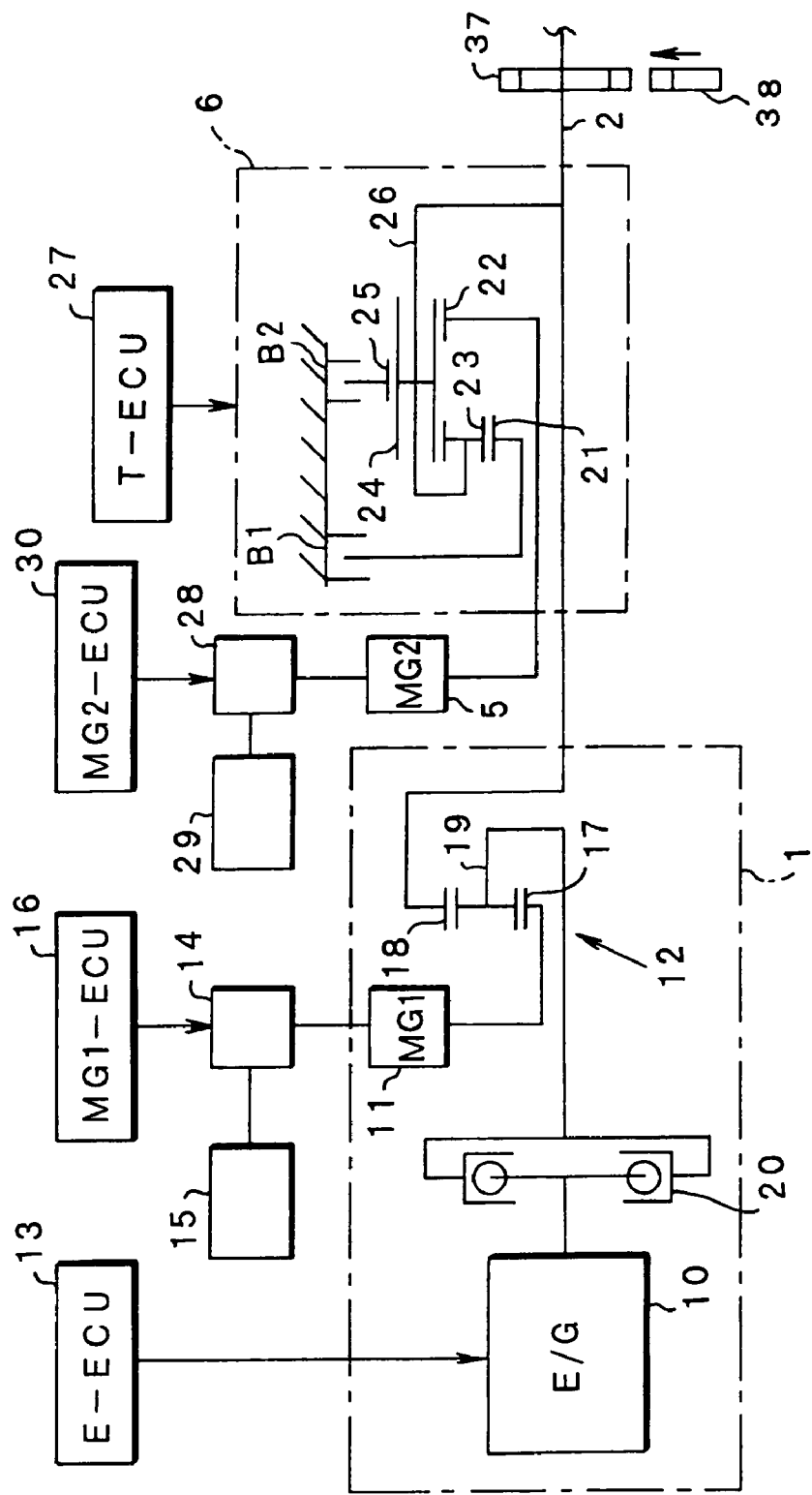
FIG. 4 is a skeleton diagram showing the drive unit of the hybrid vehicle to which the invention is applied more specifically.

Here will be described the aforementioned hybrid drive unit more specifically. As shown in FIG. 4, the main prime mover 1 is composed mainly of: an internal combustion engine (as will be called the "engine") 10; a motor generator (as will be tentatively called the "first motor generator" or "MG 1") 11; and a planetary gear mechanism 12 for synthesizing or distributing the torque between those engine 10 and first motor generator 11. The engine 10 is a well-known power unit such as a gasoline engine or a Diesel engine for outputting a power by burning a fuel. In the engine 10, a running state such as the degree of throttle opening (or the air intake amount), the fuel feed amount or the ignition timing can be controlled electrically. This control is carried out by an electronic control unit (E-ECU) 13 composed mainly of a microcomputer, for example.

On the other hand, the first motor generator 11 is exemplified by a permanent magnet type synchronous electric motor which functions as an electric motor as well as a dynamo. The first motor generator 11 is connected through an inverter 14 with an accumulator device 15 such as a battery. The output torque or the regenerative torque of the first motor generator 11 is set appropriately by controlling the inverter 14. In order to carry out this control, there is provided an electronic control unit (MG1-ECU) 16 which is composed mainly of a microcomputer. Besides, a stator (a stator not shown) of the first motor generator 11 is so fixed as not to rotate.

Moreover, the planetary gear mechanism 12 is a well-known gear mechanism for establishing a differential action. The planetary gear mechanism 12 comprises three rotary elements, such as: a sun gear 17 or an external gear; a ring gear 18 or an internal gear arranged concentrically with the sun gear 17; and a carrier 19 for holding a pinion gear meshing with those sun gear 17 and ring gear 18 in a rotatable and revolvable manner. The output shaft of the engine 10 is connected through a damper 20 to the carrier 19 as the first rotary element. In other words, the carrier 19 functions as an input element.

On the other hand, a rotor (rotor not shown) of the first motor generator 11 is connected to the sun gear 17 as a second rotary element. Accordingly, this sun gear 17 functions as the so-called "reaction element", and the ring gear 18 or a third rotary element functions as the output element. The ring gear 18 is connected to the output member (i.e., the output shaft) 2.

In the example shown in FIG. 4, on the other hand, the transmission 6 is constructed of one set of Ravignaux type planetary gear mechanisms. The planetary gear mechanism is provided with external gears, i.e., a first sun gear (S1) 21 and a second sun gear (S2). The first sun gear 21 meshes with a first pinion 23, the first pinion 23 meshes with a second pinion 24, and the second pinion 24 meshes with a ring gear (R) 25 arranged concentrically with the individual sun gears 21 and 22. Here, the individual pinions 23 and 24 are so held by a carrier (C) 26 as to rotate on their axes and to revolve around the carrier 26. Moreover, the second sun gear 22 meshes with the second pinion 24. Thus, the first sun gear 21 and the ring gear 25 form a double-pinion type planetary gear mechanism together with the individual pinions 23 and 24, and the second sun gear 22 and the ring gear 25 form a single pinion type planetary gear mechanism together with the second pinion 24.

There are also provided a first brake B1 for fixing the first sun gear 21 selectively, and a second brake B2 for fixing the ring gear 25 selectively. These brakes B1 and B2 are the so-called "frictional engagement devices" for establishing engaging forces by frictional forces, and a multi-disc engagement device or a band type engagement device can be adopted. Torque capacity of the brakes B1 and B2 change continuously according to the engaging forces established by the oil pressure. Moreover, the aforementioned assist prime mover 5 is connected to the second sun gear 22, and the carrier 26 is connected to the output shaft 2. Furthermore, a parking gear 37 for fixing the output shaft 2 to keep the vehicle into a parking state is installed on the output shaft 2. Also, there is provided a parking lock pawl 38 for halting a rotation of the parking gear 37 by engaging therewith, in case a parking position is selected by a not shown shifting device.

In the transmission 6 thus far described, therefore, the second sun gear 22 is the so-called "input element", and the carrier 26 is the output element. The transmission 6 is constructed to set the high gear stage wherein the speed change ratio is higher than "1" by applying the first brake B1, and to set the low gear stage wherein the speed change ratio is higher than that of the high gear stage by applying the second brake B2 in place of the first brake B1. The speed change operation between those individual gear stages are executed on the basis of a running state such as a vehicle speed or a drive demand (or the degree of accelerator opening). More specifically, the speed change operation is controlled by predetermining gear stage regions as a map (or a speed change diagram) and by setting any of the gear stages according to the detected running state. For these controls, there is provided an electronic control unit (T-ECU) 27, which is composed mainly of a microcomputer.

Here, in the example shown in FIG. 4, there is adopted a motor generator (as will be tentatively called the "second motor generator" or "MG2") as the assist prime mover 5, which has the functions of a power mode to output the torque and a regenerative mode to recover the energy. This second motor generator 5 is exemplified by a permanent magnet type synchronous electric motor and its rotor (rotor not shown) is connected to the second sun gear 22. Also, the second motor generator 5 is connected through an inverter 28 with a battery 29. Moreover, there is provided an electronic control unit (MG2-ECU) 30, which is composed mainly of a microcomputer. The electronic control unit (MG2-ECU) 30 controls the torques in the individual modes such as the power mode and the regenerative mode by controlling the inverter 28. Here, the battery 29 and the electronic control unit 30 can also be integrated with the inverter 14 and the battery (the accumulator device) 15 for the aforementioned first motor generator 11. Additionally, a stator (a stator not shown) of the second motor generator 5 is so fixed as not to rotate.

A nomographic diagram of the single pinion type planetary gear mechanism 12 as the aforementioned torque synthesizing/distributing mechanism is present in FIG. 5(A). When the reaction torque generated by the first motor generator 11 is inputted to the sun gear (S) 17 against the torque of the engine 10 to be inputted to the carrier (C) 19, the torque, which is increased or decreased according to the speed change ratio of the planetary gear mechanism 12, appears on the ring gear (R) 18 functioning as the output element. In this case, the rotor of the first motor generator 11 is rotated by this torque, and the first motor generator 11 functions as a dynamo. In case the speed (or the output speed) of the ring gear 18 is constant, on the other hand, the speed of the engine 10 can be continuously (or without any step) changed by increasing/decreasing the speed of the first motor generator 11. Specifically, the control for setting the speed of the engine 10 at a value for the best fuel economy can be made by controlling the first motor generator 11.

As indicated by a chain line in FIG. 5(A), the first motor generator 11 rotates backward when the engine 10 is halted while the vehicle is running. In this state, if the torque is outputted in a forward direction by operating the first motor generator 11 as the electric motor, the torque acts to rotate the engine 10 connected to the carrier 19 in the forward direction. As a result of this, the engine 10 can be started (i.e., motored or cranked) by the first motor generator 11. In this case, the torque acts on the output shaft 2 in the direction to stop the rotation of the output shaft 2. Therefore, the driving torque for running the vehicle can be maintained by controlling the torque outputted from the second motor generator 5, and at the same time, the startup of the engine 10 can be executed smoothly. Here, the hybrid type of this kind is called "mechanical distribution type" or "split type".

On the other hand, a nomographic diagram of the Ravignaux type planetary gear mechanism constructing the transmission 6 is presented at (B) in FIG. 5. When the ring gear 25 is fixed by the second brake B2, a low gear stage L is set so that the torque outputted from the second motor generator 5 is amplified according to the gear ratio and applied to the output shaft 2. When the first sun gear 21 is fixed by the first brake B1, on the other hand, there is set a high gear stage H having a lower speed change ratio than that of the low gear stage L. The speed change ratio at this high gear stage is also higher than "1" so that the torque outputted by the second motor generator 5 is augmented according to that gear ratio and applied to the output shaft 2.

Here, in the state where the individual gear stages L and H are steadily set, the output torque of the second motor generator 5 which is augmented according to the gear ratio is applied to the output shaft 2. In the transitional state of the speed change operation, however, the torque is influenced by the torque capacities at the individual brakes B1 and B2, and by the inertia torque accompanying the change in the speed. Additionally, the torque to be applied to the output shaft 2 is positive when the second motor generator 5 is driving, but negative when the second motor generator 5 is being driven.

The aforementioned hybrid drive unit comprises two prime movers, i.e., the main prime mover 1 and the assist prime mover 5. For this reason, the vehicle runs at low fuel consumption and at low emission by making good use of those prime movers. The speed of the engine 10 is controlled at the optimum fuel consumption by the first motor-generator 11 even in case of driving the engine 10. Moreover, inertia energy of the vehicle is regenerated as electric power when the vehicle is coasting. In case of operating the second motor generator 5 to carry out a torque assist, the torque to be applied to the output shaft 2 is augmented by setting the transmission 6 at the low gear stage L when the vehicle speed is low. On the other hand, when the vehicle speed is raised, the speed of the second motor generator 5 is relatively lowered to reduce the loss, by setting the transmission 6 at the high gear stage H. Thus, the torque assist is carried out efficiently.

The aforementioned hybrid vehicle is capable of running by the engine 10, by both of the engine 10 and the second motor generator 5, and only by the second motor generator 5. Those running pattern is determined and selected on the basis of drive demands represented by the accelerator opening, vehicle speed and so on. For example, in case the battery charge is sufficient and the drive demand is relatively small, or in case a quiet start is selected manually, the running pattern using the second motor generator 5, i.e., the running pattern similar to an electric vehicle (as will be tentatively called "EV running") is selected and the engine 10 is halted. In this state, in case the drive demand is increased, e.g., when the accelerator pedal is depressed deeply, or in case the remaining battery level is low, or in case the running mode is shifted manually from the quiet start to a normal running, the engine 10 is started and the running pattern is shifted to the running pattern using the engine 10 (as will be tentatively called "E/G running").

In case the vehicle speed is lowered by the running resistance when the vehicle is run by inertia (i.e., when the vehicle is coasting), a speed change is carried out in the transmission 6 to a lower speed side. When this kind of "coast down shifting" is carried out, the creep torque generated by the second motor generator is lowered and then restored.

On the other hand, in case the downshifting is carried out while the vehicle is coasting, a negative torque acting on the output shaft 2 rises according to the increase in the speed change ratio. For this reason, the driveline wherein the torque is transmitted from the transmission 6 to the wheel 4 through the output shaft 2 is twisted inevitably. The output shaft torque (or the driving torque) is changed due to the back action of the twisted driveline, and this change in the output shaft torque is the cause of a shift shock. This kind of torque change resulting from the torsion of the driveline is periodical, therefore, in order to prevent or suppress the shock arising from the speed change operation by delaying the timing to restore the creep torque in comparison with the timing when the output shaft torque is raised, the control system of the present invention executes a control to be described hereinafter.

Figure 1:
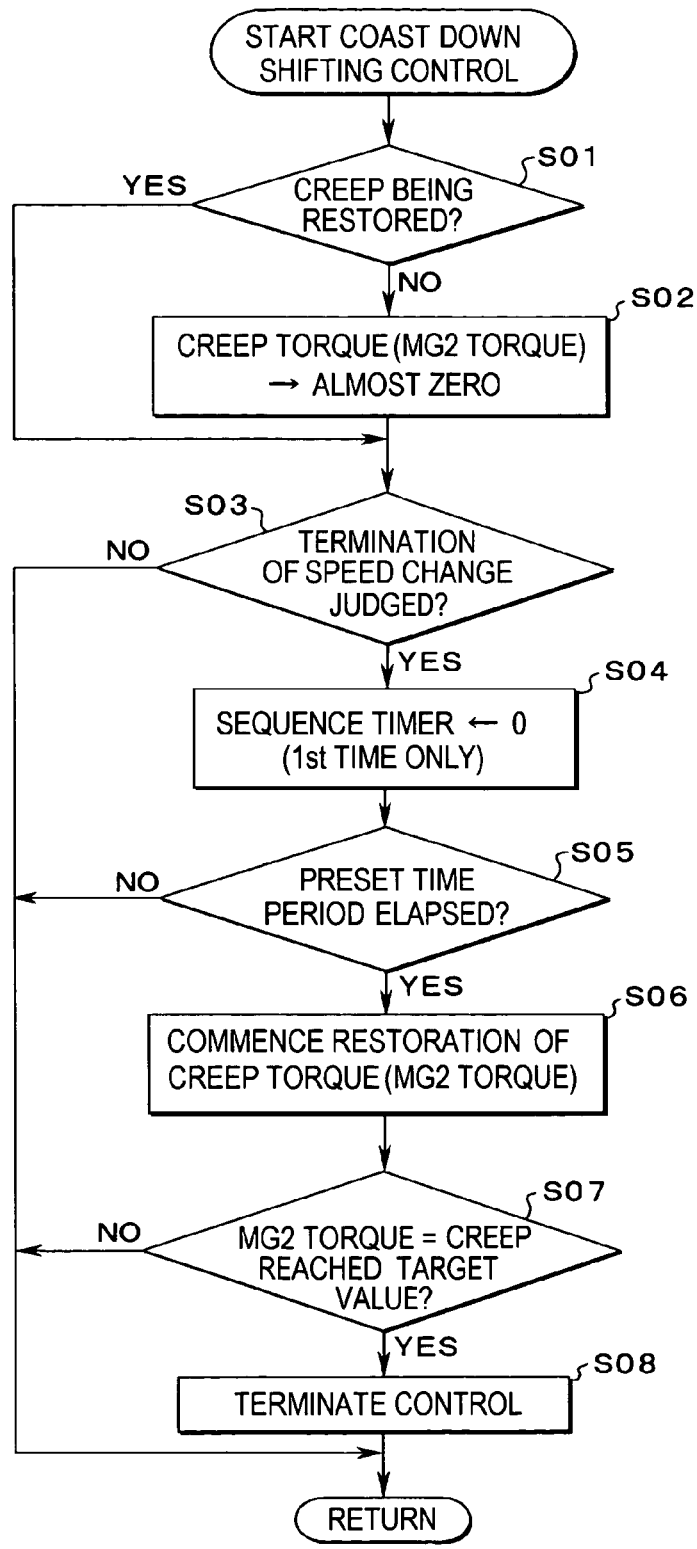
FIG. 1 is a flowchart for explaining a control example by a control system of this invention.

FIG. 1 is a flowchart showing one example of the control. The routine shown in this flowchart is carried out during the downshifting of the case in which the vehicle is coasting. First of all, it is judged (at step S01) whether or not the creep torque is being restored. Here, the restoration of the creep torque means the control to raise the creep torque of the second motor generator 5 which is lowered temporarily in connection with the coast down shift to the initial torque. Since the creep torque is lowered during the speed change operation, the answer of step S01 is NO before the termination of the speed change. In this case, the creep torque (i.e., the output torque of the second motor generator 5) is lowered (at step S02). For example, the creep torque is lowered to almost zero.

Then, it is judged (at step S03) whether or not the judgment of the termination of the speed change operation is satisfied. For example, the termination of the speed change can be judged: by judging whether or not the speed of a predetermined rotary member such as the second motor generator 5 or the second sun gear 22 reaches the synchronous speed; or by judging whether or not a difference between the speed of the predetermined rotary member and the synchronous speed becomes the preset value or smaller. In case the judgment of the termination of the speed change operation is not satisfied so that the answer of step S03 is NO, the routine is returned. In other word, the preceding control is continued. On the contrary, in case the answer of step S03 is YES, i.e., in case the judgment of the termination of the speed change operation is satisfied, a sequence timer is reset to zero and time count is commenced (at step S04). Additionally, this control is carried out only in case of first-time satisfaction of the judgment at step S03, specifically, only when the judgment of the termination of the speed change operation is satisfied under the condition in which the judgment of the termination of the speed change operation has not yet been satisfied.

At the subsequent step S05, it is judged whether or not a count value of the sequence timer started at step S04 reaches the preset value, in other words, it is judged whether or not a preset time period has elapsed. The preset time period has not yet elapsed immediately after the start of the sequence timer, so that the answer of step S05 is NO and the routine is returned. In this case, the creep torque has not yet been restored so that the answer of step S01 is NO, and the control to lower the creep torque is continued at step S02. As has been described above, although the answer of step S03 is YES and the routine advances to step S05, step S04 is carried out only for the first-time satisfaction of the judgment at step S03. Namely, the sequence timer continues to count.

The preset time period is a criterion of judgment to be made at step S05, and the restoration of the creep torque is delayed for the length of the preset time period in comparison with the termination of the speed change operation. The length of the preset time period is determined in advance on the basis of the period of the torsional vibration in the driveline resulting from the coast down shift, more specifically, on the basis of the period of the torque change of the driveline. In case the preset time period has elapsed so that the answer of step S05 is YES, a restoring control of the creep torque, i.e., the control to raise the creep torque is commenced (at step S06).

The creep torque is generated by the second motor generator 5, therefore, it is judged (at step S07) whether or not the torque of the motor generator 5 is raised to a target value of the creep torque after the restoring control of the creep torque is commenced. The answer of step S07 is NO in the beginning of the restoring control of the creep torque, and the routine is once returned to continue the restoring control. Specifically, in case the torque of the motor generator 5 does not reach the target value, the routine is returned and the creep torque is kept raised to the target value. On the contrary, in case the answer of step S07 is YES, in other words, in case the creep torque is judged to reach the target value, the creep torque is kept at the target value and the restoring control is terminated (at step S08).

Next, changes in the speeds and the oil pressures of the case in which the aforementioned control is carried out will be described with reference to the time chart in FIG. 2.

When the speed change command is outputted (at the point of time A), the output torque of the motor generator 5, i.e., the creep torque is set to zero, and the oil pressure command is outputted to operate the brakes B1 and B2. The aforementioned control is carried out from the assumption that the coast down shift is being carried out, therefore, the oil pressure of the brake B1 setting a high gear stage is lowered, and then, the oil pressure of the brake B2 for setting a low gear stage is raised (from the point of time A to B). Additionally, the oil pressure for applying the brake B2 to set the low gear stage is raised temporarily in the beginning by a "first fill control", in order to reduce the pack clearance of the second brake B2.

Then, when the judgment of the termination of the speed change operation is satisfied (i.e., at the point of time B, when the answer of step S03 is "YES"), the sequence timer is reset to commence the time count (i.e., from the point of time B to C, corresponding to step S04), and await the lapse of the preset period (i.e., from the point of time B to C). When the preset period has elapsed (i.e., at the point of time C, when the answer of step S05 is "YES"), the restoring control of the creep torque is commenced, and the output torque of the second motor generator 5 is raised (i.e., from the point of time C to D, corresponding to step S06). Specifically, the output shaft torque is started to be raised as a result of the restoration of the creep torque, at the instant when the vibration resulting from the torsion of the driveline arising from the downshifting, i.e., the periodical fluctuation of the torque almost converges. Consequently, it is possible to avoid or minimize a temporal overlap between the timing when the output shaft torque is raised periodically due to the torsional vibration arising from a downshifting, and a timing when the output shaft torque is raised as a result of the restoration of the creep torque. Then, when the creep torque reaches the target value (i.e., at the point of time D, when the answer of step S07 is "YES"), the control is terminated (i.e., at the point of time D, corresponding to step S08).

Here will be compared the present invention with an example of the prior art in which the creep torque is restored simultaneously with the termination of the speed change operation. According to the prior art, the creep torque is started to be raised at the instant when the speed change operation is terminated (as indicated by a broken line in FIG. 2). For this reason, the output shaft torque is raised as a result of the rise in the creep torque in time with the back action of the driveline which is twisted as a result of the speed change operation. Consequently, the creep torque is added to the output shaft to amplify the torsional vibration of the driveline, as indicated by the broken line in FIG. 2. Therefore, the periodical fluctuation in the torque after the termination of the speed change operation becomes wider, and this makes the shock arising the speed change operation significant.

According to the control system of the invention thus far described, the timing to start the restoration of the creep torque is delayed for the preset time period in comparison with the timing of the termination of the speed change operation. Therefore, it is possible to avoid the temporal overlap between the timing of the rise of the creep torque and the timing of the rise of the output shaft torque arising from the torsion of the driveline. As a result, the periodical fluctuation in the output shaft torque is suppressed, and the shock arising from the speed change operation is therefore prevented or eased.

Figure 2:
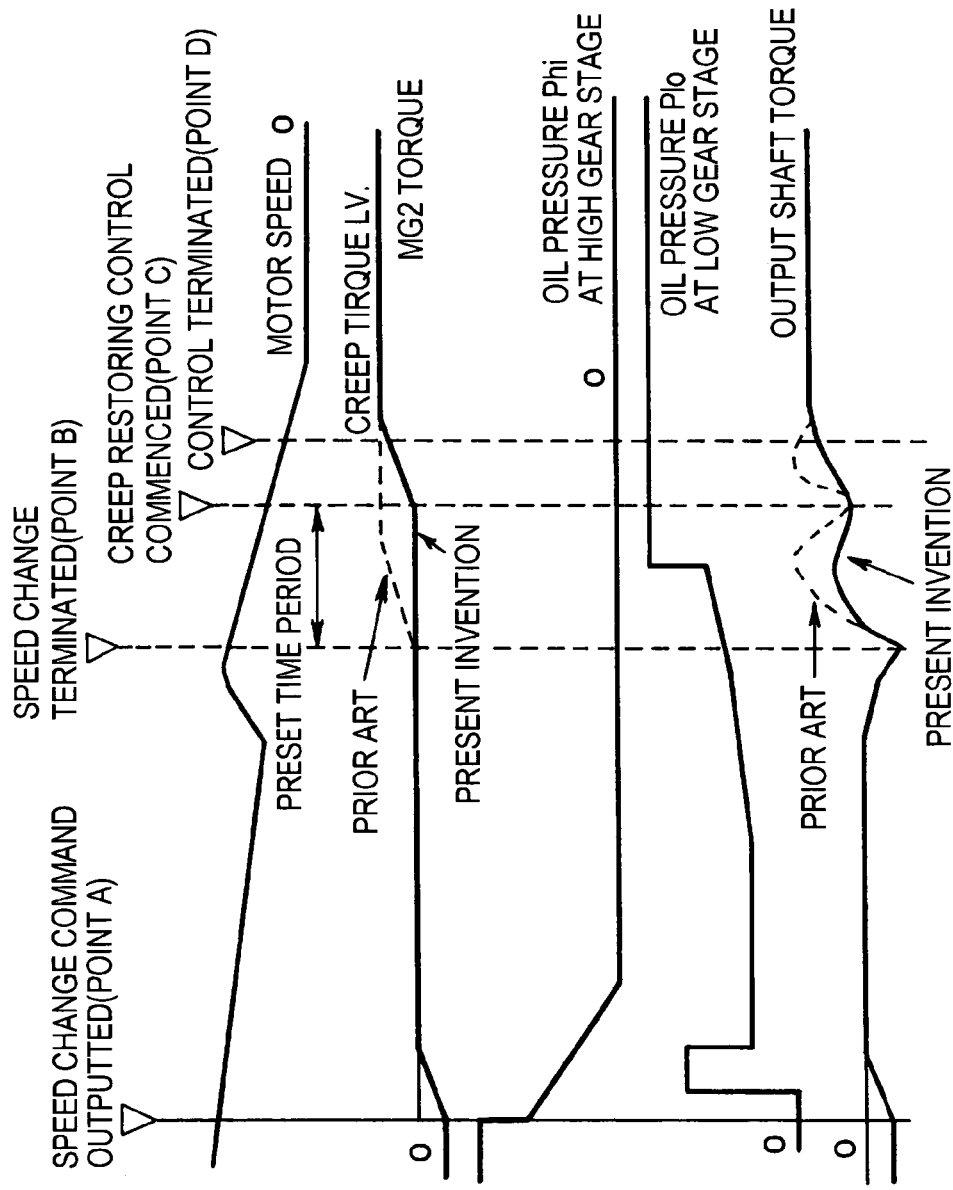
FIG. 2 is a flowchart for explaining a control example by a control system of this invention.

As mentioned above, according to the control example shown in FIG. 2, the creep torque is restored substantially at the convergence instant of the torsional vibration of the driveline resulting from the speed change operation. In other words, the creep torque is raised after the convergence of the torque fluctuation of the output shaft 2. Therefore, as a result of carrying out this control example, the timing when the output shaft torque is raised by the torsion of the driveline resulting from the speed change operation, and the timing when the output shaft torque is raised by the restoration of the creep torque, are not overlapped with each other. Consequently, the shock arising from the speed change operation is prevented.

Here, the period of the torsional vibration of the driveline resulting from the coast down shift can be detected in advance. Therefore, the preset time period at step S05 can be determined on the basis of the detected period of the torsional vibration. In addition to this, or instead of this, it is also possible to raise the creep torque periodically and delay the period to raise the creep torque in comparison with the period of the torsional vibration of the driveline resulting from the speed change operation. Consequently, the creep torque acts to suppress the torsional vibration arising from the speed change operation so that the shock can be prevented or reduced. Moreover, the convergence of the torsional vibration can be hastened.

Here will be briefly described the relations between the aforementioned specific example and this invention. A device or means for judging the running state (i.e., the coast down shift) where the routine shown in FIG. 1 is carried out corresponds to a running state judging means of the invention, a device or means having a function of step S02 corresponds to a creep torque lowering means of the invention, and a device or means having a function of step S03 corresponds to a speed change termination judging means of the invention. Moreover, a device or means having a function of step S05 corresponds to an elapsed time judging means of the invention, and a device or means having a function of step S07 corresponds to a creep restoring means of the invention.

Lastly, the drive unit of the hybrid vehicle to which the invention is applied should not be limited to the specific examples illustrated in FIGS. 3 to 5. Namely, the present invention may be applied to a drive unit for hybrid vehicles having a transmission in the output side of an electric prime mover generating creep torque.

What is claimed is:

1. A control system for hybrid vehicles in which an electric prime mover is connected to an output shaft through a transmission, comprising:
   a running state judging means for judging whether or not a downshifting is being carried out to increase speed change ratio of the transmission while a vehicle is coasting;
   a creep torque lowering means for lowering creep torque generated by the electric prime mover, in case the running state judging means judges that the downshifting is being carried out;
   a speed change termination judging means for judging a termination of the downshifting; and
   a creep restoring means for raising the lowered creep torque to the previous level subsequent to the termination of downshifting, at a timing which is delayed in comparison with a timing when the torque is raised due to a torsional vibration arising from the downshifting.

2. The control system for hybrid vehicles according to claim 1, further comprising:
   an elapsed time judging means for judging whether or not a preset time period has elapsed from the termination of the downshifting, and
   wherein the creep restoring means includes a means for raising the lowered creep torque to the previous level, in case a lapse of the preset time period is judged.

3. The control system for hybrid vehicles according to claim 2, wherein the creep restoring means includes:
   a means for raising the lowered creep torque to the previous level, in case the elapsed time judging means judges a lapse of a preset time period, which is determined on the basis of a period of the torsional vibration of the driveline in which the torque is outputted from the transmission through the output shaft.

4. The control system for hybrid vehicles according to claim 2, wherein the creep restoring means includes:
   a means for raising the lowered creep torque to the previous level, in case the elapsed time judging means judges a lapse of a preset time period, which is determined on the basis of a convergence time of a torque fluctuation in the driveline in which the torque is outputted from the transmission through the output shaft.

5. The control system for hybrid vehicles according to claim 2, wherein the creep restoring means includes:
   a means for raising the creep torque of the electric prime mover after the lapse of the preset time period, while fluctuating the creep torque to suppress the torque fluctuation of the output shaft arising from the termination of the speed change operation.

6. The control system for hybrid vehicles according to claim 5, wherein the creep restoring means includes:
   a means for raising the lowered creep torque to the previous level, in case the elapsed time judging means judges a lapse of a preset time period, which is determined on the basis of the period of the torsional vibration in the driveline in which the torque is outputted from the transmission through the output shaft.

7. The control system for hybrid vehicles according to claim 5, wherein the creep restoring means includes:
a means for raising the lowered creep torque to the previous level, in case the elapsed time judging means judges a lapse of a preset time period, which is determined on the basis of a convergence time of a torque fluctuation in the driveline in which the torque is outputted from the transmission through the output shaft.

8. The control system for hybrid vehicles according to claim 1:
wherein the hybrid vehicle comprises a prime mover including an internal combustion engine and an electric motor having a function to generate electric power; and
wherein the output shaft is connected to the prime mover.

9. A control system for hybrid vehicles in which an electric prime mover is connected to an output shaft through a transmission, comprising:
a running state judging device for judging whether or not a downshifting is being carried out to increase the speed change ratio of the transmission while a vehicle is coasting;
a creep torque lowering device for lowering creep torque generated by the electric prime mover, in case the running state judging device judges that the downshifting is being carried out;
a speed change termination judging device for judging the termination of the downshifting; and
a creep restoring device for raising the lowered creep torque to the previous level subsequent to a termination of the downshifting, at a timing which is delayed in comparison with the timing when the torque is raised due to a torsional vibration arising from the downshifting.

10. The control system for hybrid vehicles according to claim 9, further comprising:
an elapsed time judging device for judging whether or not a preset time period has elapsed from the termination of the downshifting, and
wherein the creep restoring device raises the lowered creep torque to the previous level, in case the lapse of preset time period is determined.

11. The control system for hybrid vehicles according to claim 10,
wherein the creep restoring device raises the lowered creep torque to the previous level, in case the elapsed time judging device judges a lapse of a preset time period, which is determined on the basis of the period of the torsional vibration of the driveline in which the torque is outputted from the transmission through the output shaft.

12. The control system for hybrid vehicles according to claim 10,
wherein the creep restoring device raises the lowered creep torque to the previous level, in case the elapsed time judging device judges a lapse of a preset time period, which is determined on the basis of a convergence time of a torque fluctuation in the driveline in which the torque is outputted from the transmission through the output shaft.

13. The control system for hybrid vehicles according to claim 9,
wherein the creep restoring device raises the creep torque of the electric prime mover after a lapse of the preset time period, while fluctuating the creep torque to suppress the torque fluctuation of the output shaft arising from the termination of the speed change operation.

14. The control system for hybrid vehicles according to claim 13,
wherein the creep restoring device raises the lowered creep torque to the previous level, in case the elapsed time judging device judges a lapse of a preset time period, which is determined on the basis of the period of the torsional vibration of the driveline in which the torque is outputted from the transmission through the output shaft.

15. The control system for hybrid vehicles according to claim 13,
wherein the creep restoring device raises the lowered creep torque to the previous level, in case the elapsed time judging device judges a lapse of a preset time period, which is determined on the basis of a convergence time of a torque fluctuation in the driveline in which the torque is outputted from the transmission through the output shaft.

16. The control system for hybrid vehicles according to claim 9,
wherein the hybrid vehicle comprises a prime mover including an internal combustion engine and an electric motor having a function to generate electric power; and
wherein the output shaft is connected to the prime mover.

* * * * *